(12) United States Patent
Kenny et al.

(10) Patent No.: US 11,946,784 B2
(45) Date of Patent: *Apr. 2, 2024

(54) APPARATUS, SYSTEM AND METHODS FOR IMPROVED METALWORKING LUBRICANT MONITORING, RECORDING AND REPORTING

(71) Applicant: International Refining & Manufacturing Co., Evanston, IL (US)

(72) Inventors: Frank Joseph Kenny, Mount Prospect, IL (US); Steve John Glowacz, Palatine, IL (US)

(73) Assignee: INTERNATIONAL REFINING & MANUFACTURING CO., Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,633

(22) Filed: Nov. 30, 2021

(65) Prior Publication Data

US 2022/0228712 A1 Jul. 21, 2022

Related U.S. Application Data

(63) Continuation of application No. 16/908,231, filed on Jun. 22, 2020, now Pat. No. 11,199,294.

(60) Provisional application No. 62/864,639, filed on Jun. 21, 2019.

(51) Int. Cl.
*G01D 9/00* (2006.01)
*F16N 25/04* (2006.01)
*F16N 29/04* (2006.01)

(52) U.S. Cl.
CPC .............. *G01D 9/005* (2013.01); *F16N 25/04* (2013.01); *F16N 29/04* (2013.01)

(58) Field of Classification Search
CPC .......... G01D 9/005; F16N 25/04; F16N 29/04
See application file for complete search history.

(56) References Cited

U.S. PATENT DOCUMENTS

| | | | | |
|---|---|---|---|---|
| 4,726,448 A | * | 2/1988 | Schroeder | ............... B60R 17/02 184/3.2 |
| 5,224,051 A | * | 6/1993 | Johnson | ............. B23Q 11/1061 700/169 |

(Continued)

OTHER PUBLICATIONS

Industrial Innovations SPRA-RITE Lubricant Monitoring System (LMS); 2019 Industrial Innovations, Inc.'s Sep. 2019 Flyer; https://www.industrialinnovations.com/pdf/2019-II-LMS-1000-flyer-SEP19.pdf.

(Continued)

*Primary Examiner* — Raymond L Nimox
(74) *Attorney, Agent, or Firm* — Patzik, Frank & Samotny Ltd.

(57) ABSTRACT

The present disclosure is directed to an improved metalworking lubricant monitoring, logging, recording, calculating, analyzing, alerting and reporting apparatus, system and method that monitors data and changes to the lubricant application process and the amount and concentration of lubricant being dispensed or delivered, analyzes, calculates and records data and changes or alterations to the amount dispensed, and alerts or reports the data and changes in real-time, when necessary, over various communication channels, to those responsible for overseeing the system changes.

20 Claims, 10 Drawing Sheets

(56) References Cited

U.S. PATENT DOCUMENTS

| | | | |
|---|---|---|---|
| 5,531,085 A * | 7/1996 | Hayes | B05B 12/00 |
| | | | 72/39 |
| 5,690,738 A | 11/1997 | Boelkins | |
| 5,797,983 A | 8/1998 | Boelkins | |
| 5,849,086 A | 12/1998 | Boelkins | |
| 6,463,967 B1 * | 10/2002 | Boyle | B67D 7/428 |
| | | | 141/94 |
| 6,567,710 B1 | 5/2003 | Boelkins | |
| 8,934,998 B1 | 1/2015 | Boelkins et al. | |
| 9,422,146 B2 | 8/2016 | Rogers | |
| 9,816,495 B2 * | 11/2017 | Aiken | F04B 15/02 |
| 10,259,088 B2 | 4/2019 | Bangma | |
| 2005/0114088 A1 * | 5/2005 | Gorden | G01M 15/05 |
| | | | 702/185 |
| 2006/0049000 A1 | 3/2006 | Boelkins et al. | |
| 2006/0049280 A1 | 3/2006 | Boelkins | |
| 2006/0053026 A1 | 3/2006 | Boelkins | |
| 2007/0202603 A1 * | 8/2007 | Counts | G01N 33/2894 |
| | | | 436/43 |
| 2009/0192834 A1 | 7/2009 | Adams | |
| 2017/0066096 A1 | 3/2017 | Boelkins et al. | |
| 2017/0066097 A1 | 3/2017 | Bangma | |
| 2017/0102308 A1 | 4/2017 | Gillette | |
| 2017/0113315 A1 | 4/2017 | Bangma et al. | |
| 2018/0306616 A1 * | 10/2018 | Gillette, II | G01F 1/56 |

OTHER PUBLICATIONS

Fabtech North America's Largest Metal Forming, Fabricating, Welding and Finishing Event Nov. 11-14, 2019; Booth: D45246; Industrial Innovations Inc.'s Flyer; https://s36.a2zinc.net/Clients/SME/Fabtech2019/public/eBooth.aspx?IndexInList=13&FromPage=Exhibitors.aspx&ParentBoothID=&ListByBooth=true&BoothID=338708.

Unist Smartflow; Copyright 2020—Unist, Inc.; www.unist.com/smartflow.

Fabtech North America's Largest Metal Forming, Fabricating, Welding and Finishing Event Nov. 11-14, 2019; Booth: D46339; Unist, Inc.'s Flyer; https://s36.a2zinc.net/Clients/SME/Fabtech2019/public/eBooth.aspx?IndexInList=23&FromPage=Exhibitors.aspx&ParentBoothID=&ListByBooth=true&BoothID=309574.

* cited by examiner

APPARATUS, SYSTEM AND METHODS FOR IMPROVED METALWORKING LUBRICANT MONITORING, RECORDING AND REPORTING

This present application claims the benefit of U.S. Non-Provisional patent application Ser. No. 16/908,231 filed Jun. 20, 2020, and U.S. Provisional Patent Application No. 62/864,639 filed Jun. 21, 2019 and titled "APPARATUS, SYSTEM AND METHODS FOR IMPROVED METALWORKING LUBRICANT MONITORING, RECORDING AND REPORTING," which are hereby incorporated by reference in their entirety as though fully set forth herein.

FIELD OF THE DISCLOSURE

The present disclosure relates to an apparatus, system and methods for improved metalworking lubricant monitoring, logging, recording, alerting and reporting. In particular, the present disclosure relates to an improved metalworking lubricant system that can be integrated into a lubricant application system to calculate and monitor data and changes to the lubricant application process, including the amount and concentration of lubricant being dispensed, record the data and changes, and alert or report the data and changes in real-time when necessary, over various communication channels, to those responsible for overseeing the systems changes.

BACKGROUND OF THE DISCLOSURE

Lubricant applicator systems are used to spray or dispense lubricants during metal stamping, tube bending, roll forming, and hydroforming processes, among other processes. The metalworking lubricants or fluids described herein pertain to fluids that influence heat generation in the metalworking process, for example by reducing friction between the tool and the work piece and dissipating and conducting the heat generated thereby, cooling the device and reducing thermal damage.

Although the present disclosure pertains to metalworking fluids, other fluids such as lubricants that are not meant to be diluted by water, or in other words, meant to stay at a constant concentration, can also be used with the present disclosure with similar results. Pressurized fluid delivery systems use pumps and nozzles to control the amount of lubricant deposits, and applicator delivery systems can dispense lubricants in graduated amounts to suitable applicators such as spray nozzles or rollers that interface with the material being stamped, bent, formed or otherwise manipulated. Adjustment of these applicator systems usually require manual turning of a screw or knob on the pump to increase or decrease the amount of lubricant used in the process.

A common type of fluid delivery system features pneumatically operated, positive displacement pumps. Fluid is drawn into individual pumps then, by actuation of a control valve, pistons force the lubricant from the pumps into supply lines and to the applicators. This system suffers from at least two drawbacks. First, the only way of adjusting a dispense volume is by mechanical adjustment of individual pump strokes. These adjustments typically are not graduated, so an operator or user repeatedly must fire and observe each deposit for each pump. Not only is this manual procedure time consuming, it wastes lubricant and must be repeated each time a job is setup. In addition, if the previous adjustment is not corrected for the next job, the wrong amount of lubricant will subsequently be dispensed. As such, most metal stamping and tube bending facilities, and the like, struggle with proper lubricant application and close usage monitoring.

Additionally, whereas lubricant usage information may be known by some in the company, for example based on purchasing data (i.e., gallons purchased), or finished goods production (parts per shift, per month, etc.), rarely if ever, is lubricant usage known down to week, the shift, the particular machine, part number, or operator, etc.

Further, lubricant application maybe fraught with operator or maintenance variations, and sometimes the belief is that the more lubricant used, the better. Because application systems are often left unlocked and not well maintained, once a change is made to an application setting, it may remain in place until noticed. This could be months later when the purchasing department detects that lubricant spend is way up. Adding to the problem is that water based lubricants are often diluted to a recommended concentration, but this too is poorly controlled.

As such, monitoring concentration provides better consistency in the forming or bending system and prevents a too rich concentration, leading to lubricant waste, or a too lean concentration, leading to poor tool life or poor part quality conditions. Further, a lack of historical usage data may create a system and processes that continue to use incorrect amounts and concentrations of lubricant, thereby reducing the system's effectiveness.

Various patents have attempted to address the shortcomings of lubricant application systems and various similar devices described herein. One example that pertains to a lubricant applicator is U.S. Pat. No. 5,531,085, titled "Die Lubricant Applicator" ("the '085 patent"), which discloses a die lubricant applicator for spraying lubricant from a pressurized source of lubricant through a plurality of injector nozzles onto a die press. Associated with each injector nozzle is a solenoid-operated valve for selectively gating the flow of the lubricant to the injector nozzle, and also an electronic control, such as a portion of a programmable logic controller, responsive to the movement of the die of the die press, for opening the solenoid valve for a predetermined and programmable dwell time, thereby passing a predetermined volume of lubricant from the pressurized source to the injector nozzle. The electronic control associated with each injector nozzle includes a programmable timer that causes the solenoid valve to open for the programmed dwell time, and the electronic control may also include a programmable counter that can inhibit the firing of the programmable dwell timer for a number of die press cycles. The lubricant spray from each injector nozzle may be adjusted to occur at a selected point during the die press cycle, and, if desired, different injectors may spray at different points during the die press cycle. A plurality of solenoid valves are assembled onto a manifold for metering the flow of lubricant to a plurality of injector nozzles.

However, the '085 patent fails to disclose a system that monitors, logs, records, analyzes and reports lubricant usage and concentration, including down to the amount used by the system, for each week, each shift, by each machine, or for a particular part number or operator, among other data and analysis. Further, the '085 patent fails to disclose a system that communicates the lubricant applicator data and analysis to those individuals that need to have the information, such as engineers and supervisors, in a real-time format and/or in daily, weekly or monthly reports as needed to create the most efficient lubricant application system.

Another example that pertains to a lubricant applicator is U.S. Pat. No. 9,816,495, titled "Pressurized Fluid Delivery System" ("the '495 patent"), which discloses a pressurized fluid delivery system in which an operator or user fully controls a lubricant deposit and the volume and timing control for each applicator. No compressed air is required and only a single power source is needed. The inventions of the disclosure make it possible to store all fluid settings with those of ancillary equipment used in a press setup.

Again, the '495 patent fails to disclose a system that monitors, logs, records, analyzes and reports lubricant usage and concentration, among other data and analysis. The '085 patent likewise fails to disclose a system that communicates relevant data and the associated analysis to the engineers and supervisors that have a need for that information, in a usable format to assist in creating a more efficient lubricant application system.

Yet another example that pertains to a lubricant applicator is U.S. Pat. No. 4,726,448, titled "Lubricant Controller" ("the '448 patent"), which discloses a device for controlling the application of lubricant to parts of a locomotive or a vehicle. Briefly stated, the distance traveled by the locomotive or the like is computed, with lubrication to a component then being provided. The distance between lubrication applications may be adjusted, as well as the amount of lubrication being applied. Further, this rate and amount of lubrication, as well as the use of lubrication at all, can be manually or automatically adjusted according to various sensors such as braking, sanding, reversing curves or the like.

Yet again, the '448 patent fails to disclose a system that monitors, logs, records, analyzes and reports lubricant usage and concentration, among other data and analysis; nor does the '448 patent disclose a system that communicates relevant data and the associated analysis to the engineers and supervisors that have a need for that information.

An example of an existing lubricant application system is the SPRA-RITE™ Ultra Lube System from Industrial Innovations, Inc. The SPRA-RITE™ Ultra Lube System is used for applying highly viscous lubricants to stamping or drawing tooling at pre-determined press stroke intervals. The SPRA-RITE™ Ultra Lube System incorporates a unique pedestal design to allow for easy transport from press to press, making it ideal for smaller shops that process high-strength and advanced materials. The SPRA-RITE™ systems is offered in various pressure ranges, and various numbers of ports, or injector valves, sometimes in multiples of 8, such as 8, 16, 24 etc. valves. These high-pressure units are designed to spray very viscous material. The turnkey system can atomize lubricant into an ultra-fine spray at the nozzles, which are air-controlled and capable of fine flow adjustments. This enables users to apply a range of lubricant from minimal amounts to maximum flow. The process control module offers numeric programming for the particular valve count and the ability to store 200 part recipes.

Additionally, each of the SPRA-RITE™ Ultra Lube System injectors is independently controlled, allowing for precise control of lubricant placement and volume as it is applied to the work piece or tooling. The controller also enables users to independently skip press cycles for pre-programmed stroke counts. The Ultra Lube system comes complete with an injector manifold, beta controls, nozzles, tubing and a 5-gallon stainless-steel reservoir with a liquid regulator, air relief valve and strainer. However, the SPRA-RITE™ Ultra Lube System, like the patent disclosures detailed above, fails to provide a monitoring and reporting system.

As such, none of these references disclose, suggest or teach an improved lubricant application system that address the disadvantages and limitations of current lubricant application systems, that the present disclosure encompasses. At a minimum, none of the references disclose a system that monitors, logs, records, analyzes and reports lubricant usage and concentration, among other data and provides associated analysis, while providing a communication capability to transmit the relevant data and analysis to the proper individuals in a number of different formats. This data and information can then be used to assist in creating more efficient lubricant application system, including the proper amount and concentration of lubricant per job. As such, none of these references successfully addresses the shortcomings addressed by the present disclosure.

What is needed is an improved lubricant application and monitoring system used with metal forming or tube bending systems, or any systems in which a liquid or gel can be applied. The improved system needs to monitor, record and report lubricant usage. There is a need for the monitoring to utilize a series of sensors interfaced with existing and/or new lubricant application equipment. There is also a need for the lubricant monitoring system to log data for immediate or subsequent analysis, and to have the capabilities to communicate or post the analyzed data to an intranet/internet site (or another location) for a real-time, on-demand dashboard view or analysis. The present disclosure satisfies these needs.

SUMMARY OF THE DISCLOSURE

In general, and in order to solve the above-mentioned shortcomings in the field of metalworking lubricant application monitoring and reporting, the present disclosure relates to lubricant application systems that monitor, log, record, calculate and analyze lubricant usage and concentration, among other data, and alert and report the analyzed data to those individuals that have a need to know and understand the data for more efficiently controlling lubricant usage.

In particular, the present disclosure relates to an apparatus, system and methods for improved metalworking lubricant monitoring, logging, recording, alerting and reporting. The present disclosure relates to an improved metalworking lubricant system that can be integrated with an existing lubricant application system or device to monitor data and changes to the lubricant application process and the amount and concentration of lubricant being dispensed or delivered, record data and changes or alterations to the amount dispensed, and alert or report the data and changes in real-time, when necessary, over various communication channels, to those third party individuals responsible for overseeing the system changes, such as engineers, operators and supervisors, among others.

The present disclosure relates to assisting metal stamping, tube bending, roll forming, hydroforming (and similar) facilities with dispensing the proper amount of lubricant and monitoring the usage, which is usually not monitored closely enough, especially not down to the amount used each week, each shift, by each machine, or for a particular part number or operator, among others.

The present disclosure further relates to more efficient lubricant applications, which are often fraught with operator or maintenance variations. The present invention provides alerts to supervisors to address situations where a system is changed for a particular application setting, and remains in place until noticed, sometimes quite a long time after the change is no longer relevant.

The present disclosure further relates to reducing incorrect dilutions of water-based lubricants, which although often diluted to a recommended concentration, need to be correctly monitored. Monitoring concentration provides better consistency in the forming or bending system and prevents an overly rich concentration, which may lead to lubricant waste, or a too lean concentration, which may lead to poor tool life or poor part quality.

The present disclosure further relates to communication functionality associated with the lubricant application system to transmit the relevant data and analysis to the operators, engineers, supervisors and other individuals that have a need to know and need for access to the information. The communication can be provided through multiple formats and protocols, to enable real-time access along with daily, weekly and monthly reports, among others that provide specific information down to the amount and concentration used each day, week, shift, by each machine, or for a particular part number or operator, among other information. This analysis and information can then be used to create more efficient lubricant applications, including the proper amount and concentration of lubricant per job or part number.

These and other aspects, features, and advantages of the present disclosure will become more readily apparent from the attached drawings and the detailed description of the preferred embodiments, which follow.

DESCRIPTION OF THE DRAWINGS

The preferred embodiments of the disclosure will be described in conjunction with the appended drawings provided to illustrate and not to the limit the disclosure, where like designations denote like elements, and in which.

DETAILED DESCRIPTION OF THE DISCLOSURE

Referring to the drawings, wherein like reference numerals refer to the same or similar features in the various views, the present disclosure pertains to an improved metalworking lubricant system that monitors data and changes to the lubricant application process and the amount and concentration of lubricant being dispensed or delivered, records these data and changes or alterations to the amount dispensed, analyzes and calculates the data, and alerts or reports the data and changes in real-time, when necessary, over various communication channels, to those third party individuals responsible for overseeing the system changes.

The present disclosure comprises numerous components to achieve the desired functionality described herein, including software programs used to control the hardware and run the system.

Figure 1:
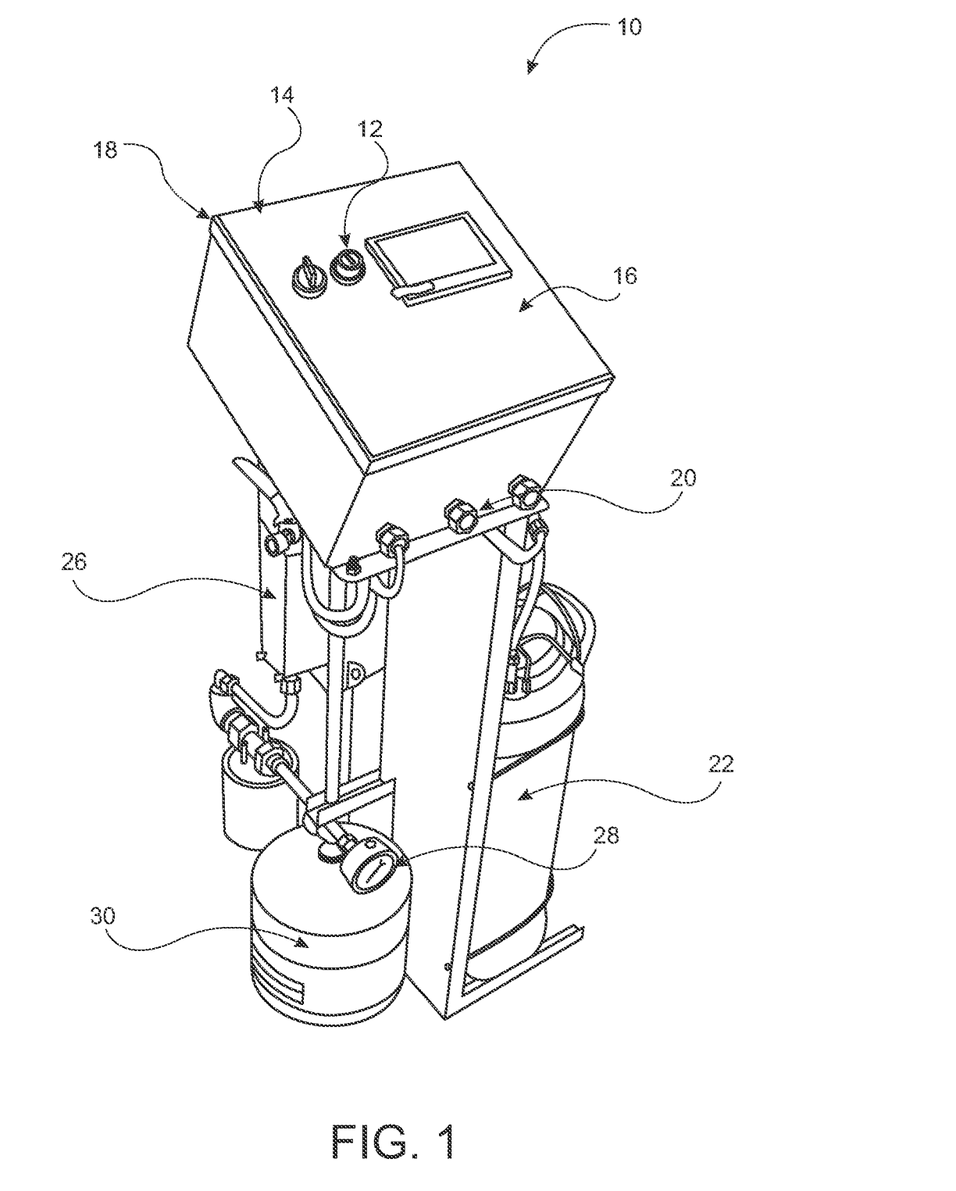
FIG. 1 shows a standard lubricant application system.

FIG. 1 shows a standard lubricant application system 10. Although an engineer can install a standalone flowmeter onto a lubrication application system, the information received merely provides a usage reference without electronic integration, monitoring and/or reporting. The industry commonly uses programmable application equipment, for example, the SPRA-RITE™ Ultra Lube Application System from Industrial Innovations, Inc. (see https://www.industrialinnovations.com). However, like other lubrication application systems 10, the SPRA-RITE™ Ultra Lube Application System only applies a lubricant dosing program, and does not log data, alert for out of parameter dosing, or communicate alerts or reports to those individuals that need to access the data to more efficiently control the system and lubrication usage.

A standard lubricant application system 10 may include a number of components to provide the dispersal or dosing of the lubricant (not shown). For example, the application system 10 may include a lock/unlock keyswitch or other similar device 12 to turn the application system 10 on and off. If a keyswitch 12 is used, then the operator will need to supply the key 14 in order to turn the system 10 on or off. Other functionality can be employed, such as a lock with a code, etc.

The application system 10 may also include a programmable logic controller (PLC) 16, which is an industrial digital computer that has been adapted to control manufacturing processes and the like, although other computing devices can be used for control purposes. The PLC 16 provides the control necessary to implement the dispersal of lubricant to the required location in the correct amounts as programmed. The application system 10 may also comprise a press binary-coded decimal (BCD) input 18, which allows the operator to input more accurate quantities to be utilized by the application system 10.

The lubrication application system 10 further comprises a press trigger 20 that allows the operator to start the application system 10 for dispensing the lubricant. The application system 10 also comprises a lubricant supply tank 22, which contains the lubricant (not shown) prior to dispensing. Various size tanks can be utilized, depending on the type of job being performed. Lubricant application can be delivered via a central system, in which standalone lubricant dilution and distribution equipment can serve multiple presses using a pump. Other systems utilize a small pump connected to a dilution tank that is prepared manually by the individual press operator.

The lubrication application system 10 comprises a manifold 24, which contains application solenoids 26, and which regulates the lubricant flow through the application system 10. In conjunction with the manifold 24, the lubrication application system 10 comprises a manifold pressure gauge 28 that measures the pressure of the manifold 24 and provides pressure data to the operator to ensure that the application system 10 is running properly. The application system 10 further comprises an accumulator 30, which works to reduce pressure spikes, thereby increasing pump life and enhancing the performance of the pumps.

FIGS. 2A, 2B and 3 through 6 show the metalworking lubricant monitoring, logging and alerting system 100 that integrates and interfaces with the lubricant application system 10 to provide the improved functionality described herein. The lubricant monitoring and alerting system 100 comprises components that allow for monitoring, logging, analyzing, alerting and reporting data and information to operators, supervisors and engineers to optimize the lubrication process.

Figure 2A:
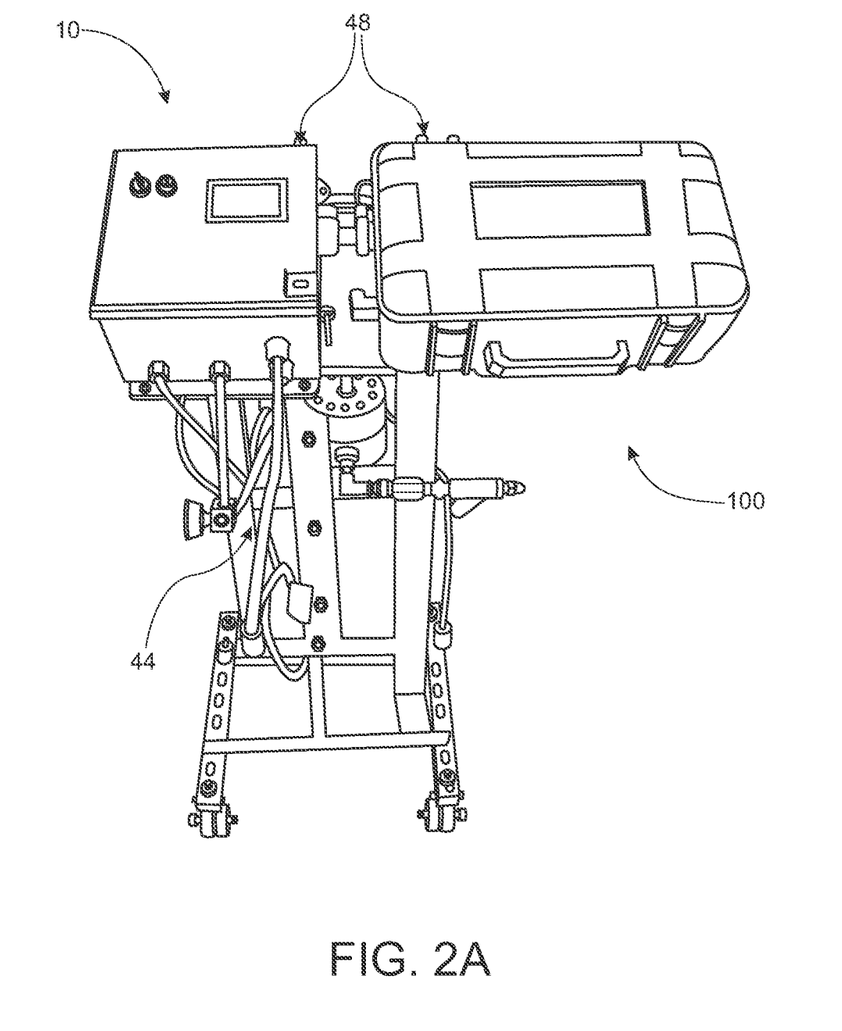
FIGS. 2A and 2B show an improved metalworking lubricant monitoring, logging and alerting apparatus, system and method in accordance with one embodiment of the present disclosure.
Figure 2B:
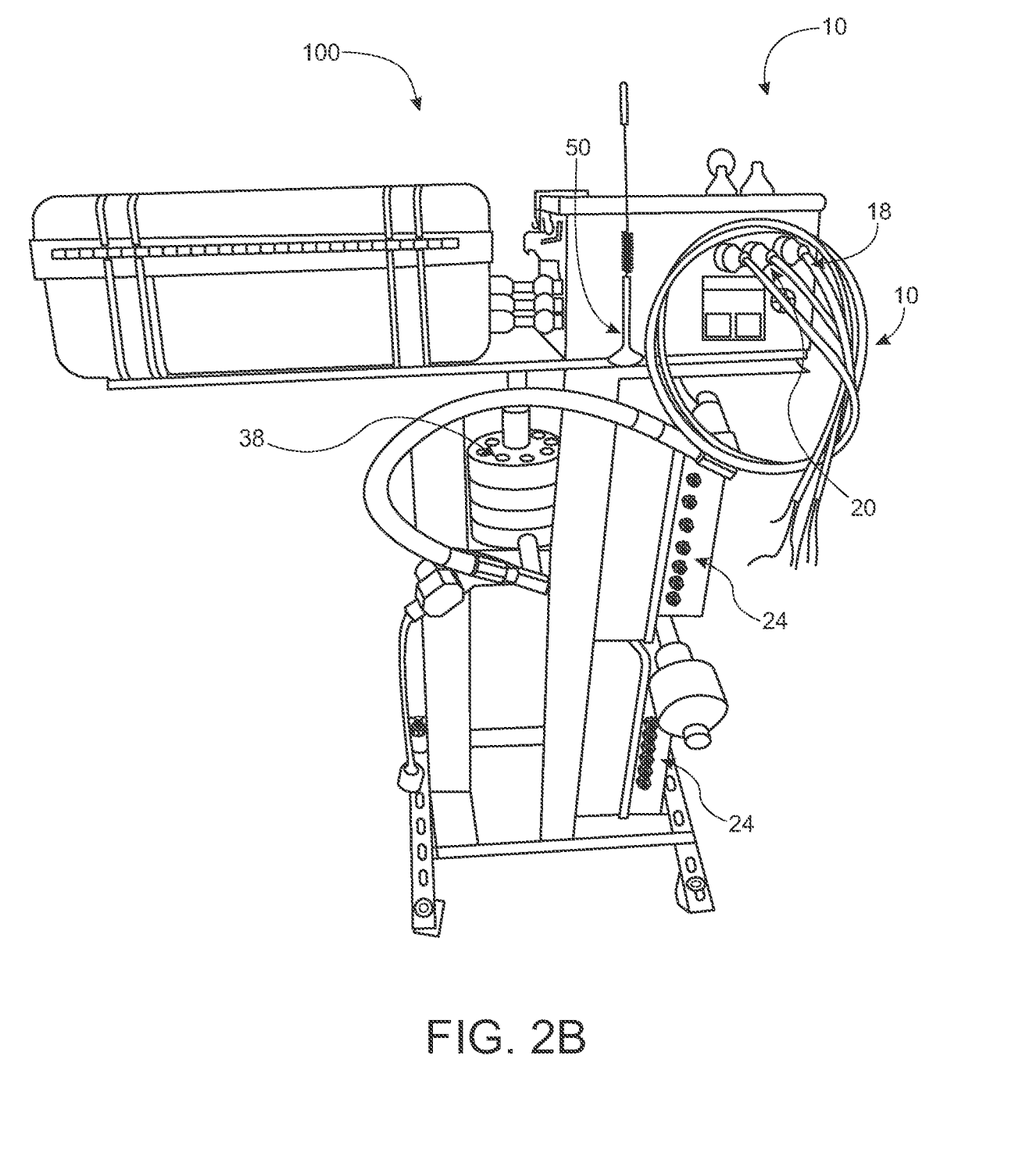
Figure 3:
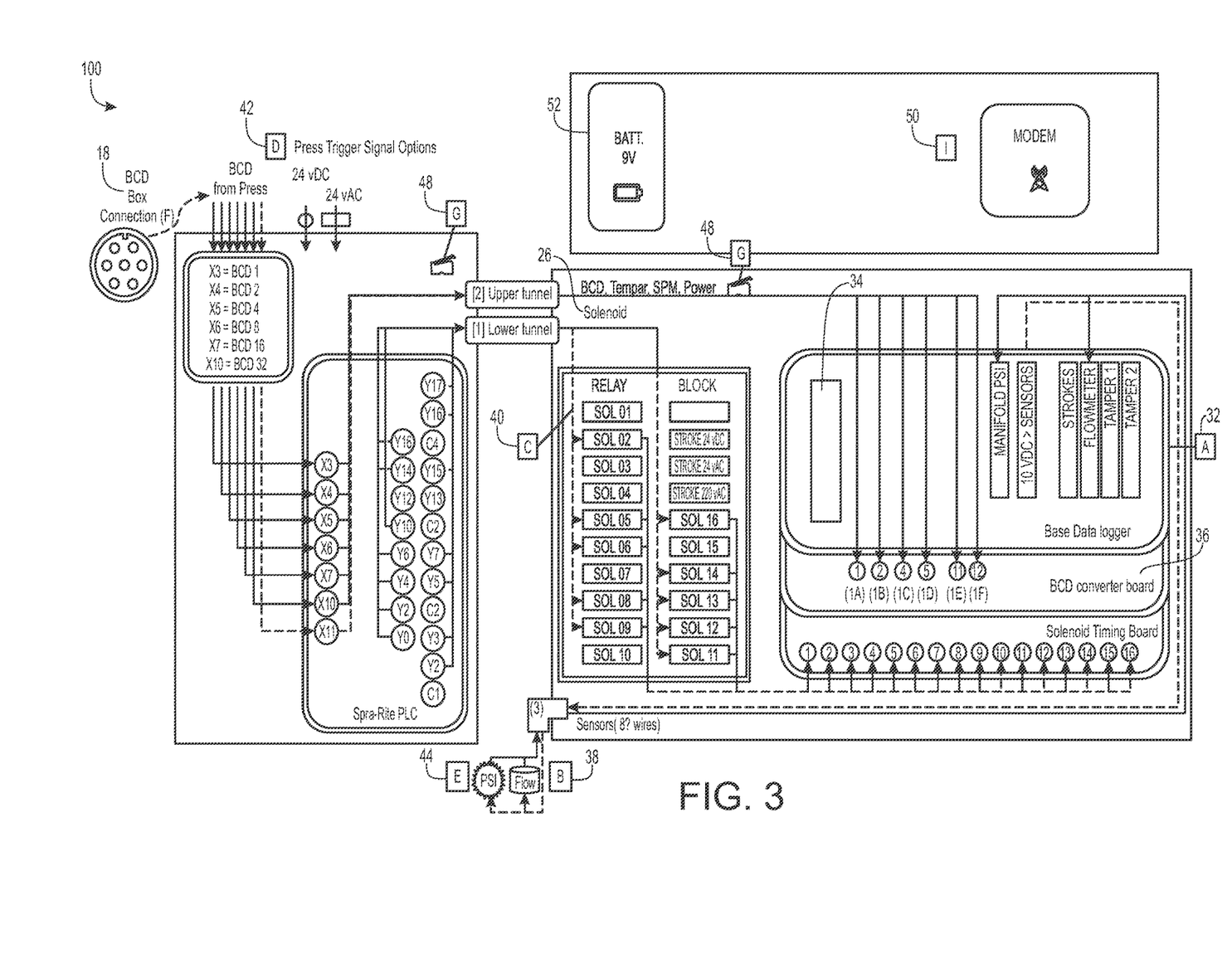
FIG. 3 shows a general schematic for the improved metalworking lubricant monitoring, logging and alerting apparatus, system and method in accordance with one embodiment of the present disclosure.

FIGS. 2A, 2B and 3 show the lubricant monitoring system 100 which comprises a datalogger system 32, which contains the microprocessor 34 and signal converter boards 36 along with the custom program that can communicate with the lubricant application system 10 and outside world. As described herein, the present disclosure can log the data and "serve" it as necessary, for example to a cloud database. As such, sensor data can be stored locally and/or passed to that cloud database, and/or provided to a third party or to third-party systems to be used for numerous purposes. Storage, access and transmittal can be provided through various analog and/or digital protocols, including for example the Internet of Things (IoT), Industry 4.0 automation and data exchange, Artificial Intelligence (AI), Bluetooth, Zigbee, 6LoWPAN, Wi-Fi, Cellular, ModBus, PROFINET, EtherCAT, among others.

As a non-limiting example, the lubricant concentration or spray volume data can be fed into an AI system that is also measuring real time material thinning, among other metrics, and automatically (or by informing the operator) increases the lubricant flow or concentration to correct or compensate.

The lubricant monitoring and alerting system 100 further comprises a flowmeter 38, which is utilized to measure the amount of lubricant consumed per stroke, and which can be one or more of numerous types, including a conventional paddle wheel flowmeter, a paddle-type pulse output or a noncontact analog output flowmeter, such as a vortex flowmeter, among others.

Another component of the monitoring and alerting system 100 is the relay array 40, which is utilized to measure the firing pattern of lubricant dosing. When interfacing with the SPRA-RITE™ Ultra Lube Application System, for example, the relay array 40 determines the individual dosing time and correlates that information to the operator entered program. In this way, the changes made to the program can be detected on a nozzle-by-nozzle basis. The monitoring and alerting system 100 can utilize a timing circuit as well.

To obtain the stroke count and job number, the monitoring and alerting system 100 comprises a wiring setup or press trigger signal options 42 such that the number of strokes per minute of the press BCD 18 recipes can be logged. When interfacing with the SPRA-RITE™ Ultra Lube Application System, for example, the wiring setup 42 effectively analyzes or listens in on the signals sent to the PLC and passes that information to the datalogger system 32.

As described herein, various sensors are utilized by the monitoring and alerting system 100 to accomplish the improved functionality. A pressure sensor 44 is utilized to measure lubricant pressure, which is important for leak detection, pump problem or operator purges.

Another sensor, the concentration sensor 46 measures the concentration of lubricant, as described herein. Tampering sensors or limit switches 48 can trigger alerts if the system is unlocked or the various enclosures are opened or tampered with.

Additionally, authenticity or analytical sensors (not shown) can be incorporated to identify the lubricant for verification purposes. The authenticity sensors can check if correct lubricant is being used, or if competitor product has been substituted.

Figure 4:
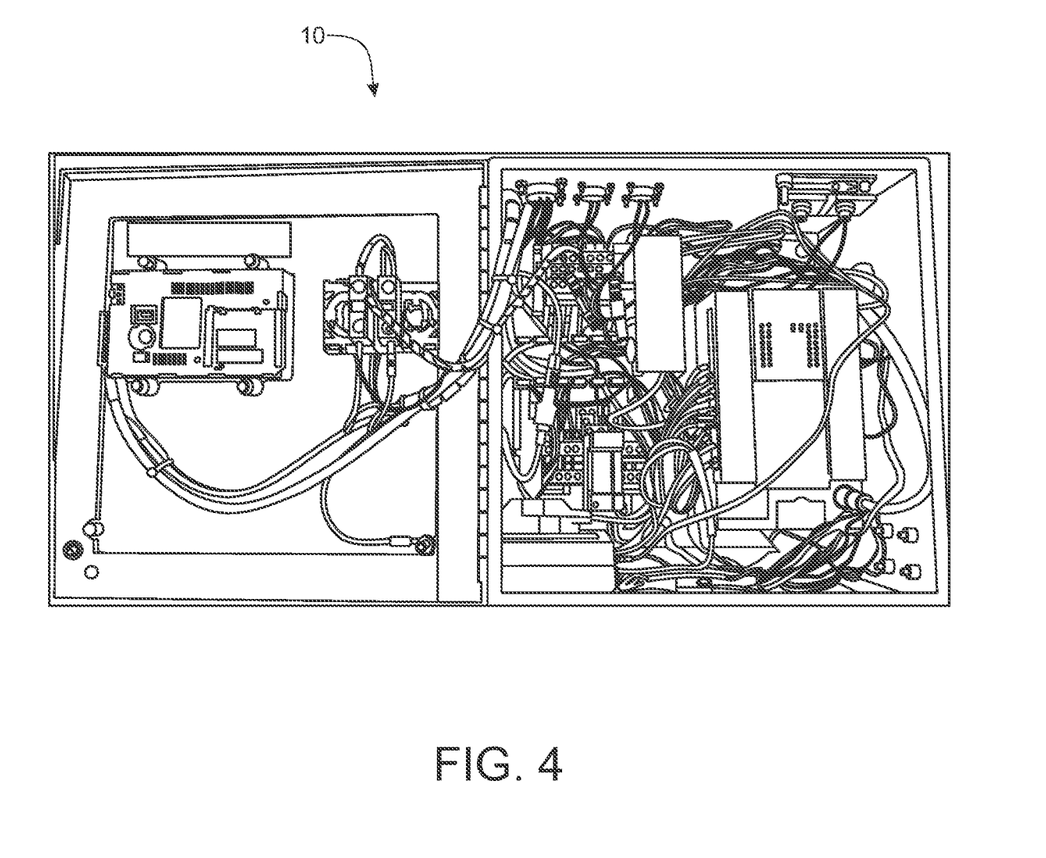
FIG. 4 shows an improved metalworking lubricant monitoring, logging and alerting apparatus, system and method integrated with a standard lubricant application system in accordance with one embodiment of the present disclosure.
Figure 5:
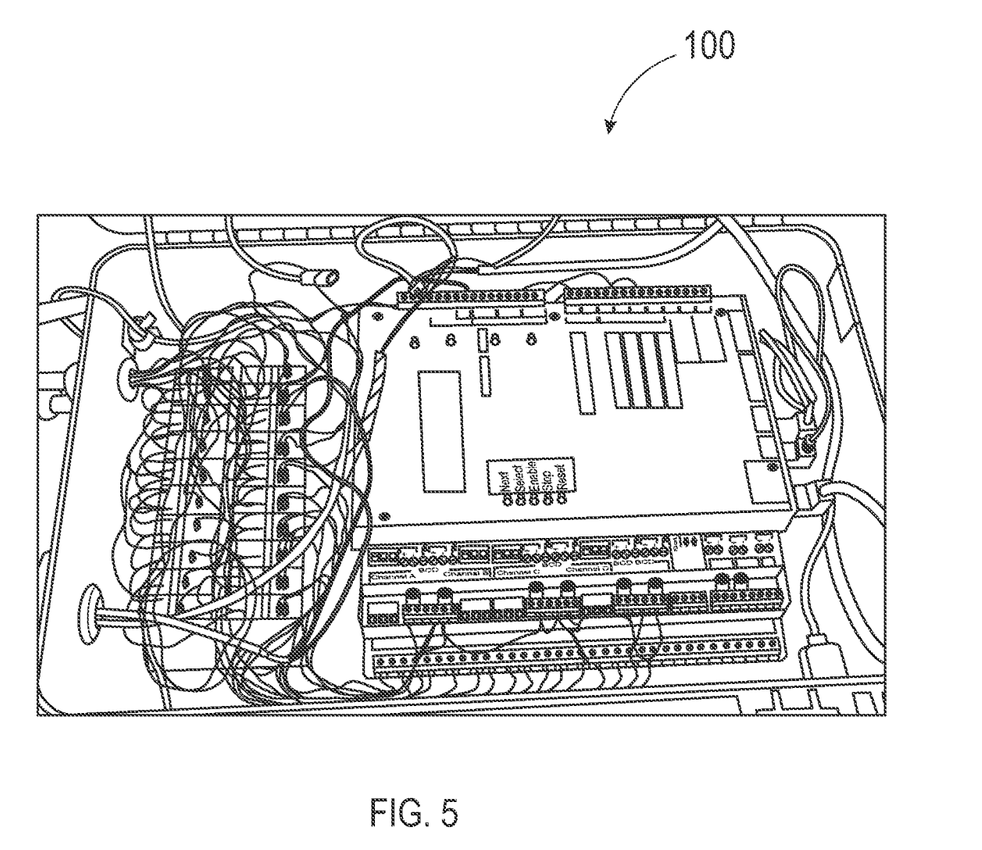
FIG. 5 shows an improved metalworking lubricant monitoring, logging and alerting apparatus, system and method integrated with a standard lubricant application system in accordance with one embodiment of the present disclosure.
Figure 6:
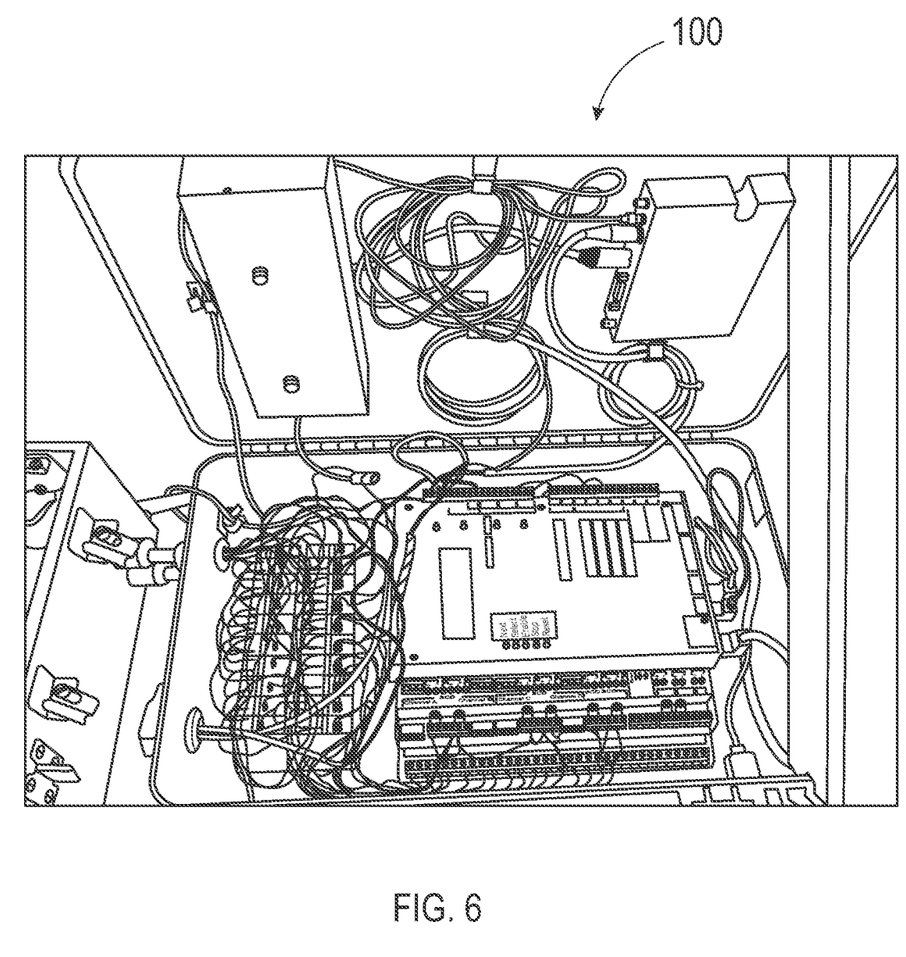
FIG. 6 shows an improved metalworking lubricant monitoring, logging and alerting apparatus, system and method integrated with a standard lubricant application system in accordance with one embodiment of the present disclosure.

FIGS. 4 through 6 show the various connections between the standard lubricant application system 10 and the monitoring and alerting system 100. FIGS. 4 and 5 shows that signals from the lubricant application system 10 are coupled or connected to the monitoring and alerting system 100. Additionally, signals from the pressure and flow sensors are likewise coupled or connected to the monitoring and alerting system 100. FIG. 6 shows the communication functionality of the monitoring and alerting system 100, along with the power or battery section. With these inputs and devices, the monitoring and alerting system 100 is able to provide the functionality as described herein.

A number of communication options exist and can be used with the lubricant monitoring and alerting system 100 to alert, notify and report data and changes or alterations in the system, including altering the amount, type or concentration of the lubricant being used in the system at that time. Information can be transmitted via communication channels 50 to the proper individuals in real-time or otherwise, using cellular technology, modems, WI-FI Adapters, Ethernet protocols, cell phone applications, Bluetooth, among others, as understood by one having ordinary skill in the art. These and other communication protocols can be used to communicate remotely to transmit the data from the datalogger system 32. Alternatively or additionally, the communication channels 50 can occur over local protocols, such as USB and others.

The lubricant monitoring and alerting system 100 can also comprise a power source 52, such as a standard or rechargeable battery, or be powered from a standard power outlet, as understood by one having ordinary skill in the art.

Monitoring data and changes to lubricant application and alterations offers many advantages. Whenever a change is made, the system can send a real time alert (email, SMS, visual light stack etc.) to a third party, such as responsible operators, engineers and/or supervisors who can investigate the change. Besides the idiosyncrasy of a particular operator, a particular lot of steel may be problematic, requiring more lubricant and the system 100 allows for that information to be communicated to the steel supplier, if desired, and once collated.

Likewise, any parameter of interest including scraps, defects, downtime, tool repair, press tonnage, etc., can be compared to lubricant usage, to more efficiently deliver lubricant for the particular job or materials. Since the monitoring data can be logged and timestamped by job number, an average application amount per part (and therefore cost) can be calculated, which would be difficult or impossible in a conventional way.

Additionally, from an accounting perspective, lubricant can transition from a common use consumable item that is simply purchased when inventory is low to a fixed cost per unit of production and therefore, easily accounted for or costed.

From a process and/or purchasing standpoint, lubricant purchasing behavior can change from an inventory model, which is often incorrect, to a consumption model, similar to relieving inventory at a retail store at a point of service register. Over time every part number can have an associated parts per gallon value, similar to miles/gallon for automobiles. A parts per gallon value can be monitored over time, looking for meaningful changes, indicating possible problems in the metalworking, tube bending, roll forming, hydroforming (and similar) systems, including tool wear, pump failures, material issues, leaks, improper nozzle size installation/sizes/clogging, dilution equipment failures, operator misbehavior, Overall Equipment Effectiveness (OEE) calculations, etc.

Figure 7A:
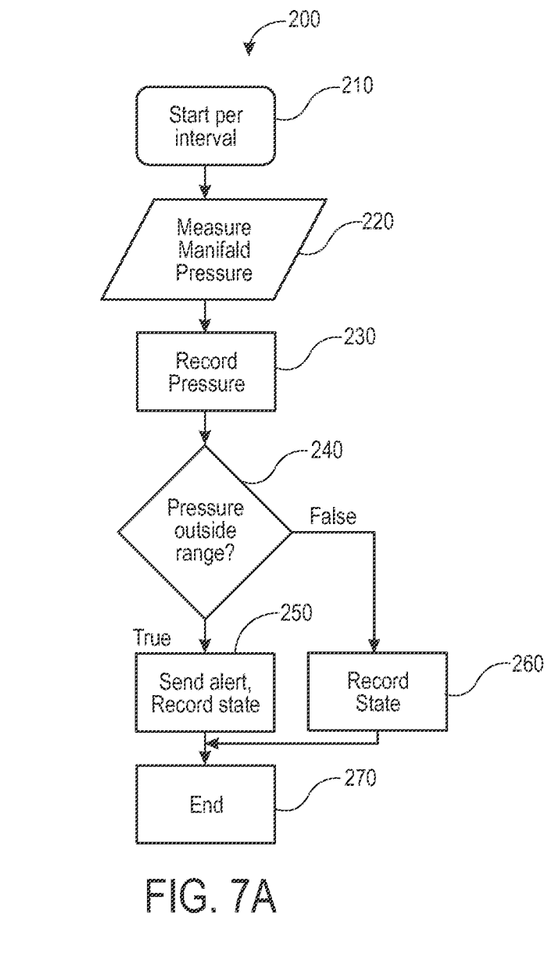
FIGS. 7A through 7H show flow charts for an improved metalworking lubricant monitoring, logging and alerting apparatus, system and method in accordance with one embodiment of the present disclosure.

FIG. 7A shows a flow chart for measuring the correct manifold pressure 28 range in the lubricant monitoring and alerting system 100. The program starts for each interval at step 210. At step 220, the monitoring and alerting system 100 measures the manifold pressure 28 and at step 230, that measurement is recorded. Next, at step 240, the monitoring and alerting system 100 checks to see if the measured pressure 28 is outside the acceptable range. If so, at step 250, the monitoring and alerting system 100 sends the appropriate alerts, records the state and ends at step 270. If not, and the pressure 28 is within the acceptable range (step 260), the program records the state and ends at step 270 without sending an alert. The program is ready to check the manifold pressure 28 during the next interval when the program runs again.

Figure 7B:
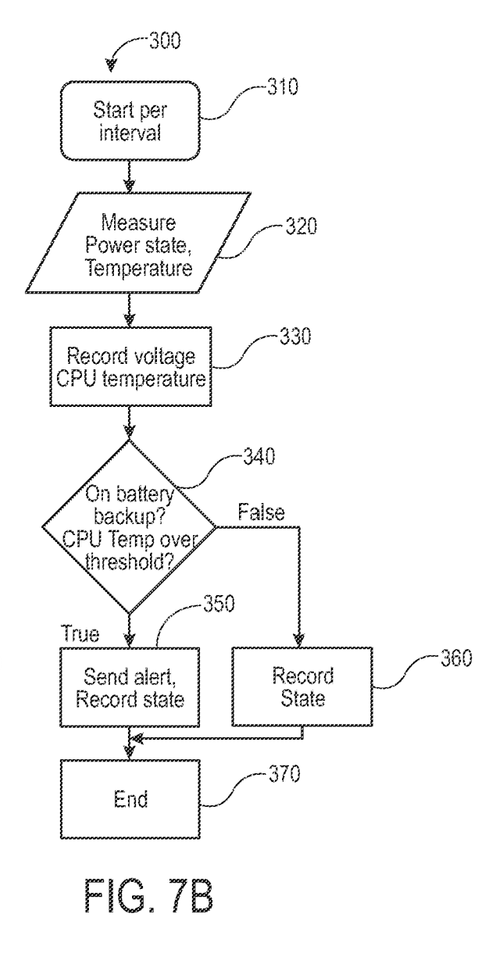

FIG. 7B shows a flow chart for measuring the correct power state and temperature in the lubricant monitoring and alerting system 100. The program starts for each interval at step 310. At step 320, the monitoring and alerting system 100 measures the voltage and CPU temperature and at step 330, those measurements are recorded. Next, at step 340, the monitoring and alerting system 100 checks to see if the system is on backup power and/or the temperature is over the threshold. If so, at step 350, the monitoring and alerting system 100 sends the appropriate alerts, records the state and ends at step 370. If not, and the voltage is not on backup and the CPU temperature is within the acceptable range (step 360), the program records the state and ends at step 270 without sending an alert. The program is then ready to check the power and temperature during the next interval when the program runs again.

Figure 7C:
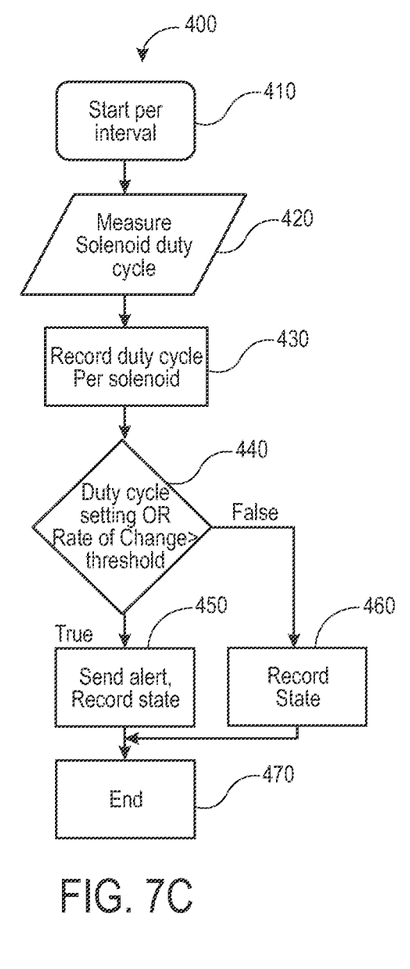

FIG. 7C shows a flow chart for measuring the solenoid duty cycle in the lubricant monitoring and alerting system 100. The program starts for each interval at step 410. At step 420, the monitoring and alerting system 100 measures the solenoid duty cycle and at step 430, those measurements are recorded. Next, at step 440, the monitoring and alerting system 100 checks to see if the duty cycle setting or if the rate of change is over the threshold. If so, at step 450, the monitoring and alerting system 100 sends the appropriate alerts, records the state and ends at step 470. If not, and the duty cycle setting and if the rate of change is not over the threshold (step 460), the program records the state and ends at step 470 without sending an alert. The program is then ready to check the duty cycle setting and the rate of change during the next interval when the program runs again.

Figure 7D:
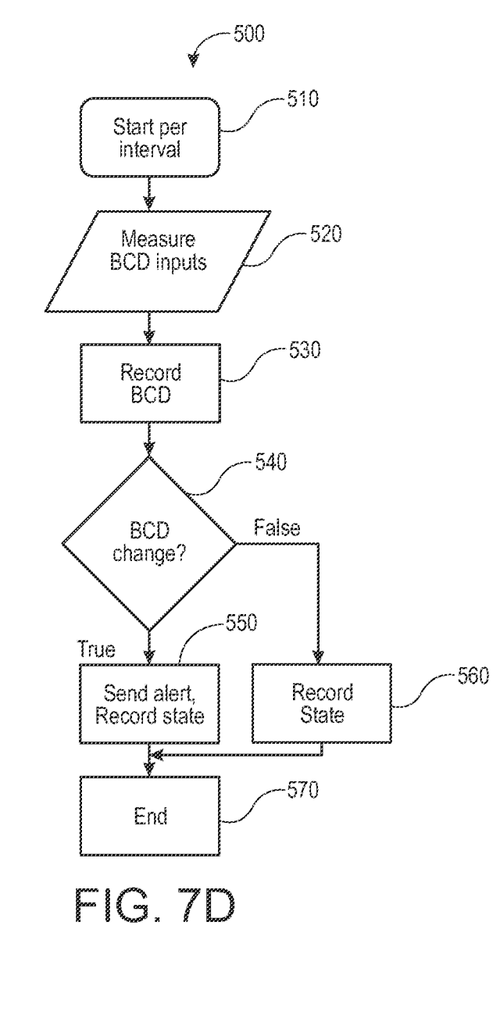

FIG. 7D shows a flow chart for checking the BCD inputs 18 in the lubricant monitoring and alerting system 100. The program starts for each interval at step 510. At step 520, the monitoring and alerting system 100 checks the BCD inputs 18 and at step 530, that information is recorded. Next, at step 540, the monitoring and alerting system 100 checks to see if the measured BCD inputs 18 have changed. If so, at step 550, the monitoring and alerting system 100 sends the appropriate alerts, records the state and ends at step 570. If not, and the BCD inputs 18 have not changed (step 560), the program records the state and ends at step 570 without sending an alert. The program is ready to check the BCD inputs 18 during the next interval when the program runs again.

Figure 7E:
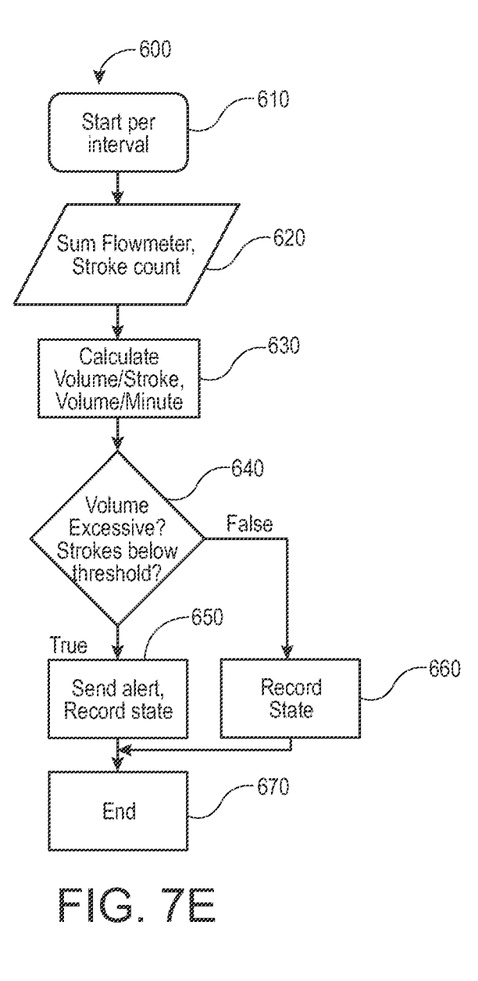

FIG. 7E shows a flow chart for measuring the flowmeter 38 and stroke count 42 in the lubricant monitoring and alerting system 100. The program starts for each interval at step 610. At step 620, the monitoring and alerting system 100 measures the flowmeter 38 sum and the stroke count 42 and at step 630, those measurements are recorded. Next, at step 640, the monitoring and alerting system 100 checks to see if the volume is excessive or if the strokes are below the threshold. If so, at step 650, the monitoring and alerting system 100 sends the appropriate alerts, records the state and ends at step 670. If not, and the volume is not excessive and if the stroke count is not below the threshold (step 660), the program records the state and ends at step 670 without sending an alert. The program is then ready to check the flowmeter 38 and the stroke count 42 during the next interval when the program runs again.

Figure 7F:
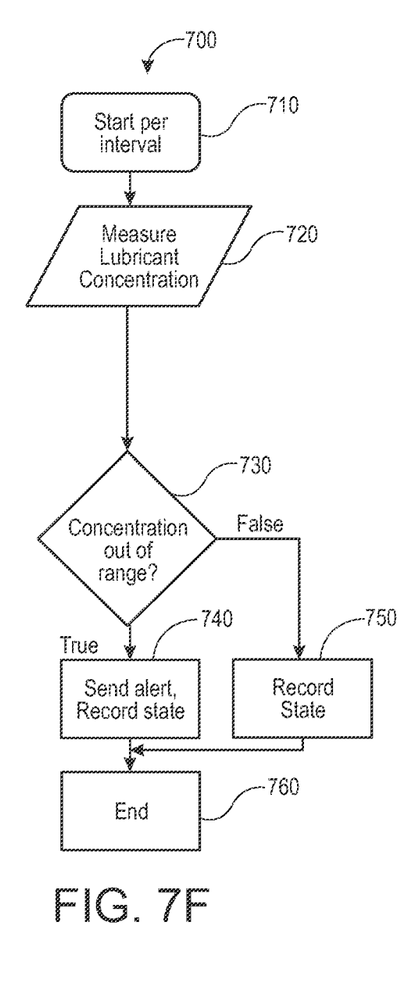

FIG. 7F shows a flow chart for measuring the lubricant concentration in the lubricant monitoring and alerting system 100. The program starts for each interval at step 710. At step 720, the monitoring and alerting system 100 measures the lubricant concentration. Next, at step 730, the monitoring and alerting system 100 checks to see if the lubricant concentration is out of range. If so, at step 740, the monitoring and alerting system 100 sends the appropriate alerts, records the state and ends at step 760. If not, and the lubricant concentration is not out of range (step 750), the program records the state and ends at step 760 without sending an alert. The program is then ready to measure the lubricant concentration during the next interval when the program runs again.

Figure 7G:
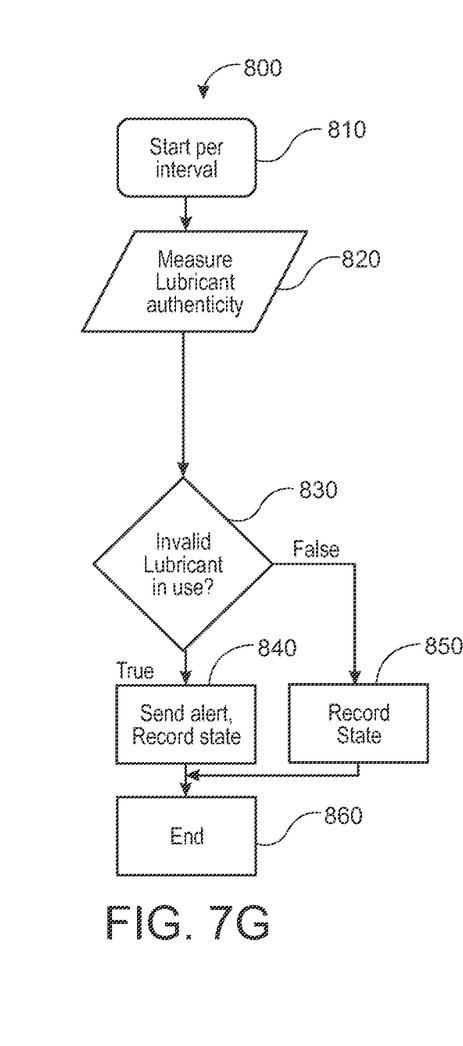

FIG. 7G shows a flow chart for determining the lubricant authenticity in the lubricant monitoring and alerting system 100. The program starts for each interval at step 810. At step 820, the monitoring and alerting system 100 measures the lubricant authenticity. Next, at step 830, the monitoring and alerting system 100 checks to see if the lubricant is not valid or authentic. If so, at step 840, the monitoring and alerting system 100 sends the appropriate alerts, records the state and ends at step 860. If not, and the lubricant is valid and authentic (step 850), the program records the state and ends at step 860 without sending an alert. The program is then ready to determine the lubricant authenticity during the next interval when the program runs again.

Figure 7H:
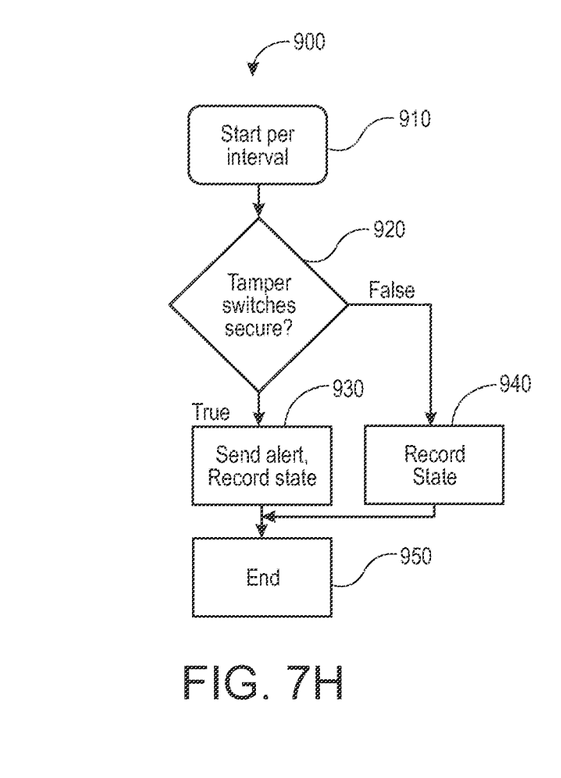

FIG. 7H shows a flow chart for determining if the tamper sensors or switches 48 are secure in the lubricant monitoring and alerting system 100. The program starts for each interval at step 910. At step 920, the monitoring and alerting system 100 checks to see if the sensors and switches 48 are secure. If not (True), at step 930, the monitoring and alerting system 100 sends the appropriate alerts, records the state and ends at step 950. If so (False), and the tamper switches 48 are secure (step 940), the program records the state and ends at step 950 without sending an alert. The program is then ready to determine if the tamper switches or sensors 48 are secure during the next interval when the program runs again.

The flow charts disclosed herein exemplify the type of controls and to some extent the software program that can be utilized to control the lubricant monitoring and alerting system 100 when it is integrated with a lubricant application system 10. These flow charts represent the software program, and can be used in combination with each other or separately, to effect the functionality of the disclosed improved lubricant monitoring and alerting system 100.

It will be understood that the embodiments of the present disclosure, which have been described, are illustrative of some of the applications of the principles of the present disclosure. Although numerous embodiments of this disclosure have been described above with a certain degree of particularity, those skilled in the art could alter the disclosed embodiments without departing from the spirit or scope of this disclosure.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present disclosure, and do not create limitations, particularly as to the position, orientation, or use of the disclosed system and methods.

Additionally, joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosed apparatus, system and methods as disclosed herein.

The invention claimed is:

1. An improved metalworking lubricant system comprising:
   a datalogger system, said datalogger system for communicating with a lubricant application system;
   a flowmeter, said flowmeter utilized to measure an amount of lubricant consumed;
   a relay array, said relay array utilized to measure a lubricant dosing firing pattern;
   a wiring setup, said wiring setup configured to pass a signal information to the datalogger system, such that a number of strokes per minute can be recorded and logged;
   a pressure sensor, said pressure sensor utilized to measure a lubricant pressure;
   a concentration sensor, said concentration sensor utilized to measure a concentration of lubricant;
   a tamper sensor, said tamper sensor utilized to trigger an alert;
   a BCD input, said BCD input configured to allow an input of quantities to be used by the improved metalworking lubricant system; and
   an authenticity sensor, said authenticity sensor configured to identify a lubricant being used.

2. The improved metalworking lubricant system of claim 1, wherein said flowmeter comprises a paddle wheel flowmeter.

3. The improved metalworking lubricant system of claim 2, wherein said paddle wheel flowmeter comprises a paddle type pulse output flowmeter.

4. The improved metalworking lubricant system of claim 1, wherein said flowmeter comprises a non-contact analog output flowmeter.

5. The improved metalworking lubricant system of claim 1, wherein said relay array determines an individual dosing time.

6. The improved metalworking lubricant system of claim 5, wherein said relay array correlates said individual dosing time to an operator entered program, thereby allowing for detecting changes made to the operator entered program on a nozzle-by- nozzle basis.

7. The improved metalworking lubricant system of claim 1, wherein said pressure sensor is used for a leak detection, a pump problem or an operator purge.

8. The improved metalworking lubricant system of claim 1, wherein said tamper sensor determines if the metalworking lubricant system has been tampered with, left opened or left unlocked.

9. The improved metalworking lubricant system of claim 1, wherein said authenticity sensor identifies the lubricant being used for authentication and verification purposes.

10. The improved metalworking lubricant system of claim 9, wherein said authenticity sensor ensures that the correct lubricant is being used.

11. The improved metalworking lubricant system of claim 1, further comprising a communication channel for communicating data from the improved metalworking lubricant system.

12. The improved metalworking lubricant system of claim 11, wherein said communicating data from the improved metalworking lubricant system is to a third party using an analog or digital protocol.

13. The improved metalworking lubricant system of claim 12, wherein said analog or digital protocol occur in real-time.

14. The improved metalworking lubricant system of claim 12, wherein said analog or digital protocol comprises cellular technology, modems, Ethernet, Internet of Things, Industry 4.0 automation and data exchange, Artificial Intelligence, Bluetooth, Zigbee, 6LoWPAN, Wi-Fi, ModBus, PROFINET, or EtherCAT.

15. The improved metalworking lubricant system of claim 12, wherein said analog or digital protocol is configured to communicate remotely.

16. The improved metalworking lubricant system of claim 12, wherein said analog or digital protocol is configured to communicate locally.

17. The improved metalworking lubricant system of claim 1, wherein said amount of lubricant consumed can be compared for a particular job or a material, including scraps, defects, downtime, tool repair, or press tonnage, to more efficiently deliver lubricant for the particular job or materials.

18. The improved metalworking lubricant system of claim 11, wherein the data can be logged and timestamped by job number, thereby allowing for an average application amount per part to be calculated.

19. The improved metalworking lubricant system of claim 12, wherein said third party comprises an engineer, an operator, or a supervisor.

20. The improved metalworking lubricant system of claim 19, wherein real time alerts are communicated to said operator, said engineer or said supervisor.

* * * * *